United States Patent
Uh et al.

(10) Patent No.: US 8,292,140 B2
(45) Date of Patent: Oct. 23, 2012

(54) FLAT DISPLAY PANEL CUTTING APPARATUS AND CUTTING METHOD USING THE SAME

(75) Inventors: Jiheum Uh, Seoul (KR); Youngmin Hwang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 714 days.

(21) Appl. No.: 12/314,621

(22) Filed: Dec. 12, 2008

(65) Prior Publication Data

US 2009/0199694 A1  Aug. 13, 2009

(30) Foreign Application Priority Data

Feb. 11, 2008  (KR) ........................ 10-2008-0012087

(51) Int. Cl.
*B26F 3/00*  (2006.01)
*G02F 1/13*  (2006.01)

(52) U.S. Cl. .......................................... 225/2; 225/96.5
(58) Field of Classification Search .............. 225/2, 96.5
See application file for complete search history.

(56) References Cited

U.S. PATENT DOCUMENTS

| | | | |
|---|---|---|---|
| 6,774,978 B2 * | 8/2004 | Shin | 225/96.5 |
| 7,583,351 B2 | 9/2009 | Yoo et al. | |
| 2006/0097022 A1 * | 5/2006 | Kim | 225/96 |
| 2007/0153218 A1 * | 7/2007 | Kim et al. | 349/187 |
| 2007/0153221 A1 | 7/2007 | Yoo et al. | |
| 2007/0164072 A1 * | 7/2007 | Nishio | 225/96.5 |
| 2009/0291613 A1 | 11/2009 | Yoo et al. | |

FOREIGN PATENT DOCUMENTS

CN  1991478 A  7/2007

* cited by examiner

*Primary Examiner* — Stephen Choi
(74) *Attorney, Agent, or Firm* — Morgan, Lewis & Bockius LLP

(57) ABSTRACT

A flat display panel cutting apparatus that includes a conveyor for feeding a loaded flat display panel to a cutting area and a spraying area; a cutting tool positioned in the cutting area, for forming primary cracks on the flat display panel, the primary cracks including two or more first cracks spaced apart from each other in the X-axis direction and two or more second cracks spaced apart from each other in the Y-axis direction; and a spraying tool positioned in the spraying area, for growing secondary cracks by spraying high temperature steam onto the first cracks or second cracks of the primary cracks formed on the flat display panel.

1 Claim, 4 Drawing Sheets

FLAT DISPLAY PANEL CUTTING APPARATUS AND CUTTING METHOD USING THE SAME

This application claims the benefit of Korean Patent Application No. 10-2008-0012087 filed on Feb. 11, 2008, which is hereby incorporated by reference.

BACKGROUND

1. Field of the Invention

This application relates to a flat display panel cutting apparatus.

2. Related Art

Along with recent full-scale development of the information age, the field of displays for displaying mass data as a visual image has been rapidly developed. In accordance with this trend, liquid crystal display devices LCDs, plasma display panel devices PDPs, field emission display devices FEDs, light emitting display devices LEDs, and the like have been introduced as flat panel display devices FPDs having the advantage of light weight, thin profile, and low power consumption, and are rapidly substituting for conventional Braun tubes (cathode ray tubes CRTs).

In general, a flat display panel fabrication process may be divided into a substrate fabrication process for acquiring first and second substrates and a cell process for forming a flat display panel by bonding both substrates together with a unique fluorescent or polarizing material layer positioned therebetween.

The substrate fabrication process and the cell process are typically carried out on first and second large-area substrates where a plurality of cell regions are identified by position in order to obtain the effects of process step reduction and yield improvement. Here, in the substrate fabrication process, pixels, thin film transistors, etc. for each of the cell regions can be formed on the first and second large-area substrates by repeatedly performing processes, such as thin film deposition, a photolithography process, and an etch process. In the cell process, a seal pattern for bonding both substrates is formed in the cell regions of any one of the first and second large-area substrates, and then both of the substrates can be bonded together with a unique fluorescent or polarizing material layer positioned therebetween. By cutting the substrates by cell region after carrying out these processes, a plurality of flat display panels can be obtained.

In the conventional cell process for cutting by cell region, a cutting apparatus can be used. The cutting apparatus typically carries out a cutting step of performing scribing along a cutting line on the surface of a target object in order to form a plurality of cracks in the X-axis and Y-axis directions and a high temperature steam spraying step of causing crack growth so that the plurality of cracks formed in the Y-axis and Y-axis directions can grow across the entire cutting line.

Although the conventional cutting apparatus can easily perform a primary crack formation for generating cracks in the X-axis and Y-axis directions in the cutting step, regions intersecting in the X-axis and Y-axis directions are damaged or broken as high temperature steam is sprayed onto primary cracks as well as onto secondary cracks in the spraying step of forming secondary cracks. Thus, a proper measure is required to solve this problem.

SUMMARY

An aspect of embodiments of the invention is to provide a flat display panel cutting apparatus, including: a conveyor for feeding a loaded flat display panel to a cutting area and a spraying area; a cutting means positioned in the cutting area, and for forming primary cracks on the flat display panel, the primary cracks including two or more first cracks spaced apart from each other in the X-axis direction and two or more second cracks spaced apart from each other in the Y-axis direction; and a spraying means positioned in the spraying area, and for growing secondary cracks by spraying a high temperature steam onto the first cracks or second cracks of the primary cracks formed on the flat display panel.

Another aspect of embodiments of the invention is to provide a flat display panel cutting method, including: feeding a flat display panel loaded on a conveyor to a cutting area and a spraying area; forming primary cracks on the cutting area by use of cutting means, the primary cracks including two or more first cracks spaced apart from each other in the X-axis direction and two or more second cracks spaced apart from each other in the Y-axis direction; and growing secondary cracks on the spraying area by use of spraying means by spraying a high temperature steam onto the first cracks or second cracks of the primary cracks formed on the flat display panel.

BRIEF DESCRIPTION OF THE DRAWINGS

The accompanying drawings, which are included to provide a further understanding of the invention and are incorporated on and constitute a part of this specification, illustrate embodiments of the invention and together with the description serve to explain the principles of the invention.

DETAILED DESCRIPTION OF THE PREFERRED EMBODIMENTS

Reference will now be made in detail embodiments of the invention examples of which are illustrated in the accompanying drawings.

Hereinafter, concrete exemplary embodiments according to the invention will be described with reference to the drawings.

First Exemplary Embodiment

Figure 1:
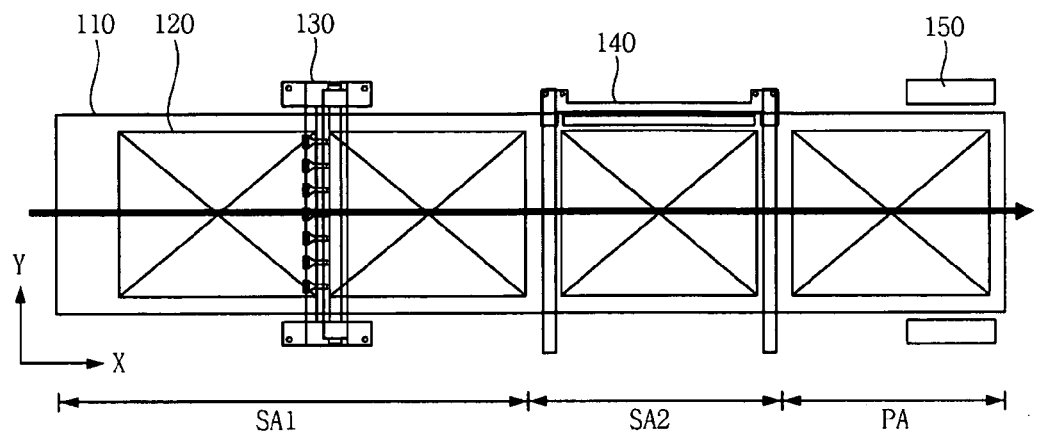
FIG. 1 is a schematic plan view of a flat display panel cutting apparatus according to a first exemplary embodiment of the invention.
Figure 2:
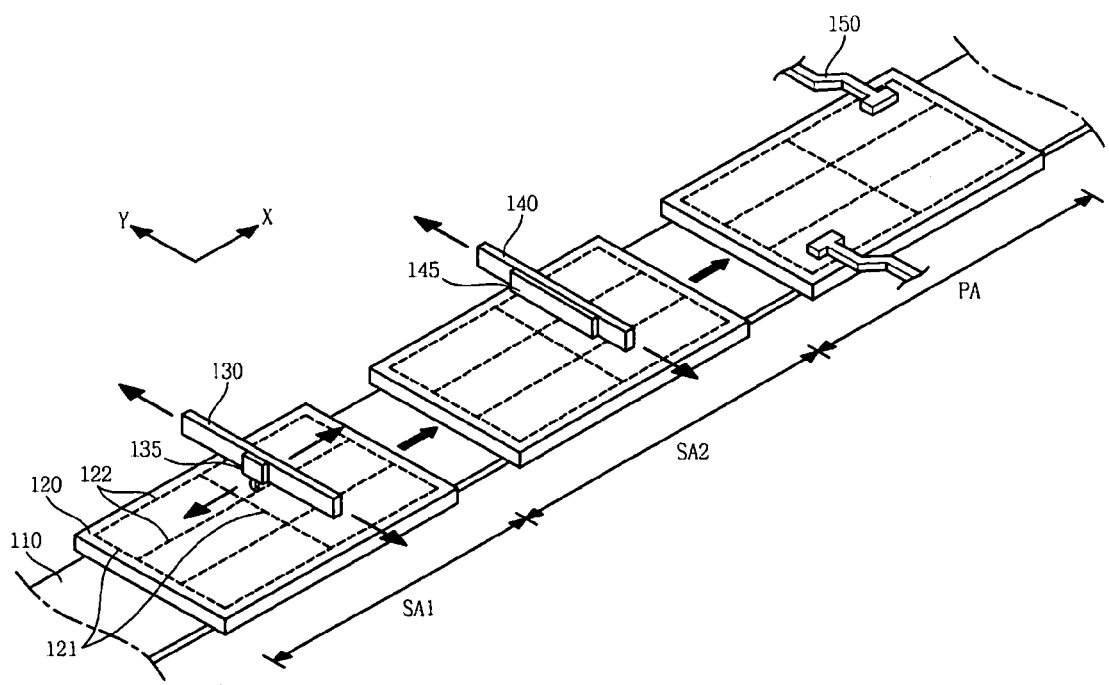
FIG. 2 is a schematic perspective view of FIG. 1.

As shown in FIGS. 1 and 2, a flat display panel cutting apparatus according to a first exemplary embodiment of the invention may comprise a conveyor 110 for feeding a loaded flat display panel 120 to a cutting area SA1 and a spraying area SA2. In addition, the flat display panel cutting apparatus may comprise a cutting means 130 positioned in the cutting area SA1, and for forming primary cracks on the flat display panel 120, the primary cracks including two or more first cracks 121 spaced apart from each other in the X-axis direction and two or more second cracks 122 spaced apart from each other in the Y-axis direction. Besides, The flat display panel cutting apparatus may comprise a spraying means 140 positioned in the spraying area SA2, and for growing the primary cracks into secondary cracks by spraying a high temperature steam onto the first cracks 121 or second cracks 122 of the primary cracks formed on the flat display panel 120.

The flat display panel 120 may comprise a plurality of display panels positioned in each cell. Here, the display panels positioned in each cell may be one of a liquid crystal display device (LCD), a field emission display device (FED), and a light emitting display device (LED).

The conveyor 110 may be disposed such that the flat display panel 120 loaded on the upper end of a belt can pass through the cutting area SA1 and the spraying area SA2 in the X-axis direction. Therefore, the conveyor 110 can feed the flat display panel 120 in the X-axis direction by using a drive means such as a motor. The conveyor 110 may be configured such that a plurality of belts are spaced apart from each other by a predetermined spacing to feed in the X-axis direction.

The cutting means 130 may comprise a scribing wheel which rotates in tight contact with the flat display panel 120 or a laser irradiation unit 135 for irradiation of a laser. The cutting means 130 may form primary cracks by applying a physical force to the flat display panel 120. The cutting means 130 may be positioned in a plural number in order to form, on the flat display panel 120 loaded on the conveyor 110, primary cracks including two or more first cracks 121 spaced apart from each other in the X-axis direction and two or more second cracks 122 spaced apart from each other in the Y-axis direction.

The cutting means 130 of this type may be positioned at least one of the upper and lower ends of the conveyor 110. Here, if the cutting means 130 is positioned on the upper end of the conveyor 110, the first cracks 121 and second cracks 122 may be formed at a top portion, which is one surface of the flat display panel. Otherwise, if the cutting means 130 is positioned on the upper end of the conveyor 110, the first cracks 121 and second cracks 122 may be formed at a bottom portion, which is the other surface of the flat display panel 120. Otherwise, if the cutting means 130 is positioned on the upper and lower ends of the conveyor 110, the first cracks 121 and second cracks 122 may be formed on one surface and the other surface of the flat display panel 120, respectively.

Subsequent to the spraying area SA2, a clamp area PA may be positioned. At least one clamp 150 can be positioned in the clamp area PA so as to adsorb one portion of the flat display panel 120 and separate and discharge it. The clamp 150 may play the role of adsorbing and removing the flat display panel 120 having the secondary cracks formed thereon.

Hereinafter, the spraying means will be described in more detail with reference to FIGS. 3 and 4.

Figure 3:
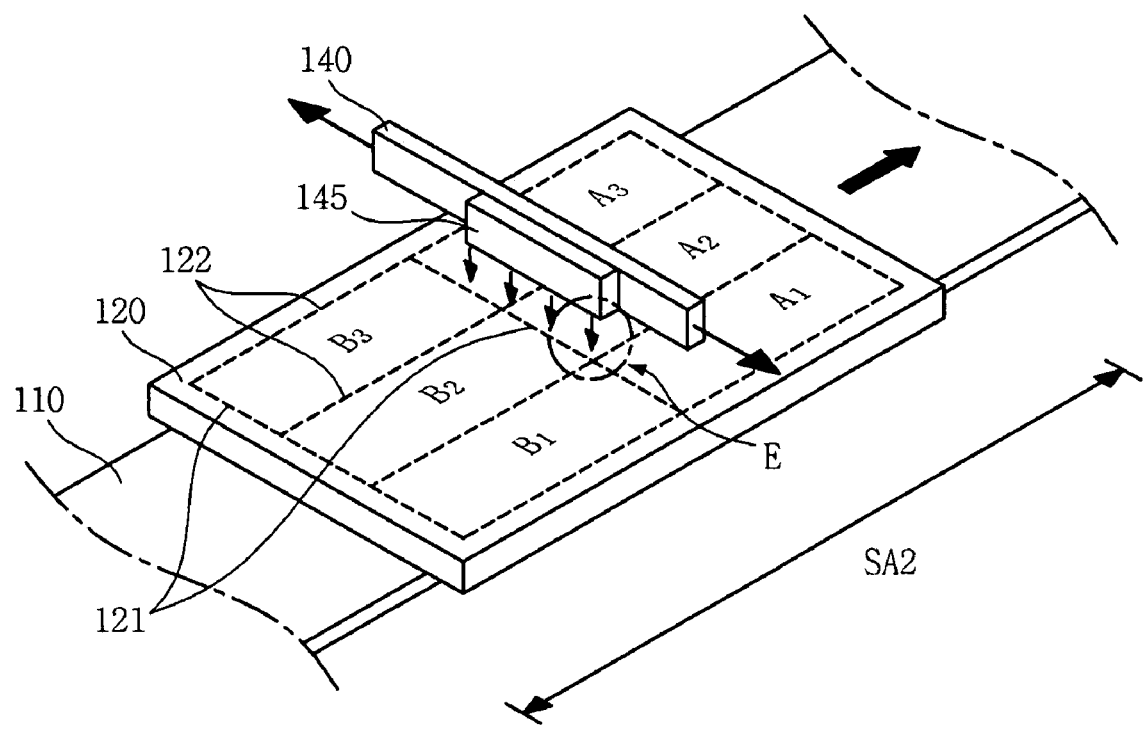
FIG. 3 is a partial perspective view of a spraying area.
Figure 4:
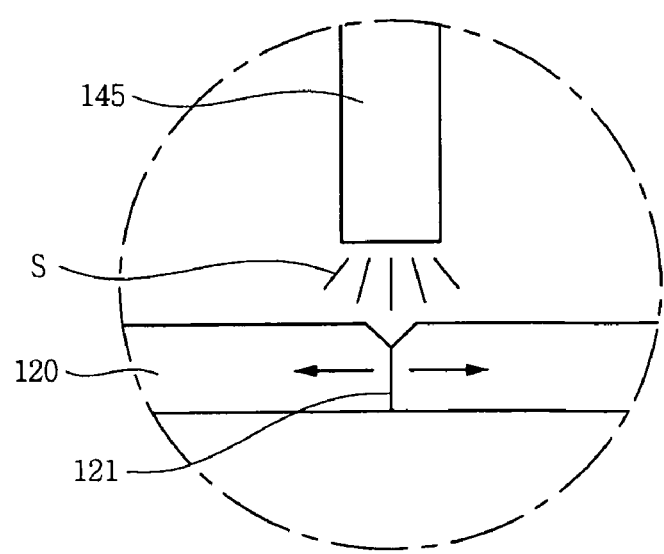
FIG. 4 is a cross sectional view of a "E" area of FIG. 3.

Referring to FIGS. 3 and 4, the spraying means 140 may be moved in the Y-axis direction.

The spraying means 140 may comprise a steam bar 145 for spraying a high temperature steam (S) in order to improve segmentation capability by growing the primary cracks formed by the cutting means 130 into secondary cracks.

When a high temperature steam (S) is sprayed onto the first cracks, for example, the first cracks 121, formed on the flat display panel 120, the primary cracks are grown into secondary cracks due to a stress generated by a temperature difference.

The above-mentioned steam bar 145 may be coupled to the spraying means 140, and at least one steam bar may be disposed in one direction. Further, the steam bar 145 may be positioned in an integrated manner in the spraying means 140. Therefore, the shapes of the spraying means 140 and steam bar 145 are not limited to those shown in the figures.

Meanwhile, the spraying means 140 may be disposed in a longitudinal direction of the Y-axis when growing two or more first cracks 121 spaced apart in the X-axis direction among the primary cracks, and may be disposed in a longitudinal direction of the X-axis when growing two or more second cracks 122 spaced part in the Y-axis direction. The spraying means 140 may be axially rotated in the X-axis or Y-axis direction in order to selectively grow either the first cracks 121 or the second cracks 122. However, the exemplary embodiment of the invention will be described by way of one example in which the spraying means 140 selects the two or more first cracks 121 spaced apart in the X-axis direction and grow them into secondary cracks.

Hereinafter, a cutting process of the flat display panel cutting apparatus according to the first exemplary embodiment of the invention will be described in detail.

First, there is performed a step of feeding a flat display pane loaded on a conveyor to a cutting area and a spraying area. By this step, when the flat display panel 120 is loaded on the conveyor 110 on which a belt turns in the X-axis direction, the flat display panel 120 is fed to the cutting area SA1.

Next, there is performed a step of forming primary cracks on the cutting area by use of cutting means, the primary cracks including two or more first cracks spaced apart from each other in the X-axis direction and two or more second cracks spaced apart from each other in the Y-axis direction. By this step, the conveyor 110 is periodically operated and stopped within the cutting area SA1, and the cutting means 130 forms, on the flat display panel 120, primary cracks including two or more first cracks 121 spaced apart from each other in the X-axis direction and two or more second cracks 122 spaced apart from each other in the Y-axis direction at each point of time when the conveyor 110 is stopped.

Next, there is performed a step of growing secondary cracks on the spraying area by use of spraying means by spraying a high temperature steam onto the first cracks or second cracks of the primary cracks formed on the flat display panel. By this step, the conveyor 110 feeds the flat display panel 120 having the primary cracks formed thereon into the spraying area SA2. At this time, as an example of the exemplary embodiment, the spraying means 140 sprays a high temperature steam to the first cracks 121 as it moves in the Y-axis direction in order to grow the primary cracks formed on the flat display panel into secondary cracks. In the spraying area SA2, the conveyor 110 can be operated and stopped periodically as it is in the cutting area SA1 in the above.

Next, there is performed a step of adsorbing one portion of the flat display panel and separating it from the flat display panel by use of a clamp positioned in the clamp area. By this step, the conveyor 110 feeds the flat display panel 120 having the secondary cracks formed thereon into the clamp area PA, and the clamp 150 is able to adsorb and remove the flat display panel 120 having the secondary cracks formed thereon.

As described above, in the flat display panel cutting apparatus according to the first exemplary embodiment of the invention, the conveyor 110 is disposed such that the flat display panel 120 can be fed in the X-axis direction in the cutting area SA1, spraying area SA2, and clamp area PA. Then, primary cracks are formed on the flat display panel 120 passing through the cutting area SA1 by using the cutting means 130 moving in the X-axis and Y-axis direction. Next, among the primary cracks formed on the flat display panel 120 passing through the spraying area SA2, the cracks positioned in the X-axis direction or in the Y-axis direction are grown into secondary cracks by using the spraying means 140 moving in the Y-axis direction. Accordingly, the flat display panel cutting apparatus according to the first exemplary embodiment of the invention can solve the problem of a defect at an intersection of the X-axis and Y-axis, edge regions, and the like, and increase panel discharge speed and improve production yield by growing only the cracks positioned in the X-axis direction or in the Y-axis direction upon growth of secondary cracks.

Meanwhile, in the flat display panel cutting apparatus according to the first exemplary embodiment of the invention, it is more advantageous to form secondary cracks in a direction vertical to a flat display panel feeding direction when considering that the second cracks formed in the same direction as the flat display panel feeding direction are satisfactory but the first cracks formed in a direction vertical to the flat display panel are less satisfactory than the second cracks.

Second Exemplary Embodiment

Figure 5:
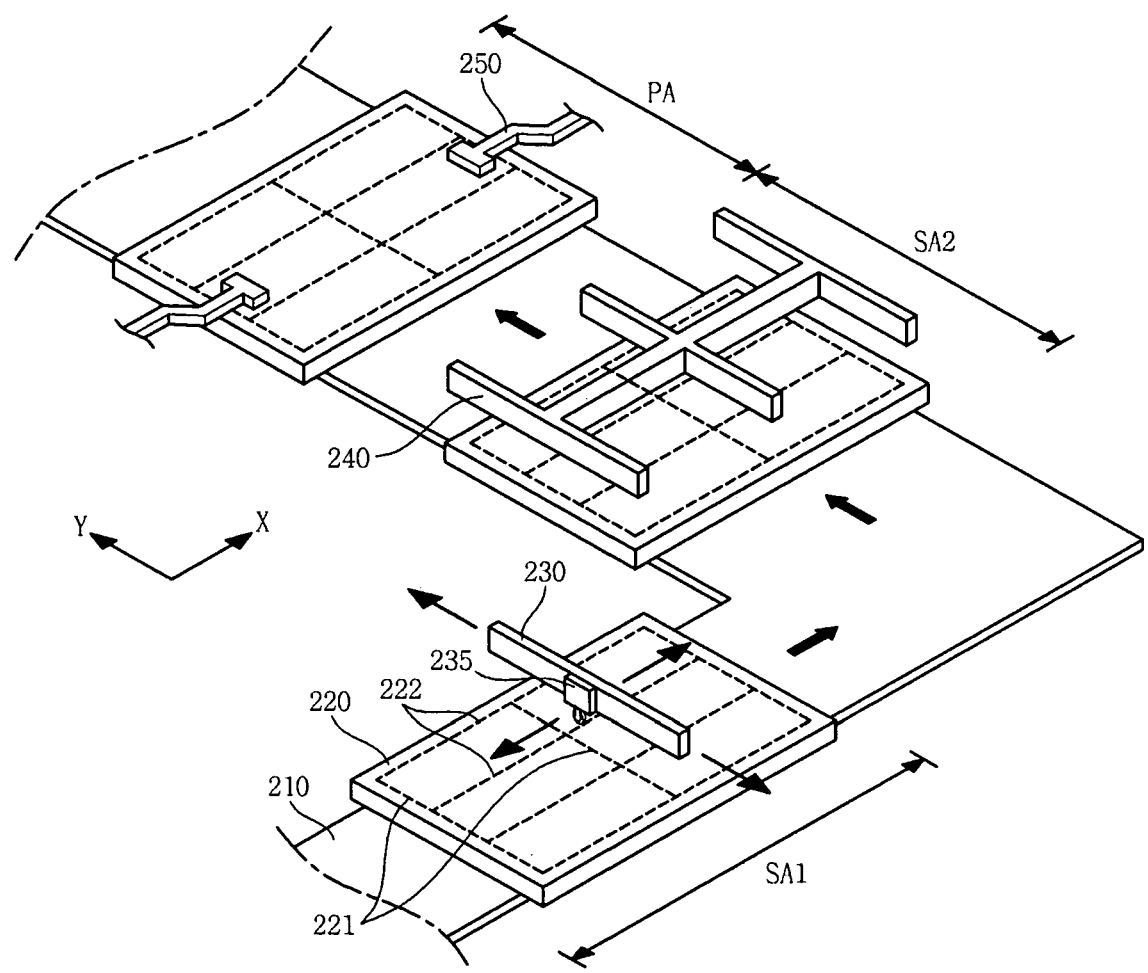
FIG. 5 is a schematic view of a flat display panel cutting apparatus according to a second exemplary embodiment of the invention.

As shown in FIG. 5, a flat display panel cutting apparatus according to a second exemplary embodiment of the invention may comprise a conveyor 210 for feeding a loaded flat display panel 220 to a cutting area SA1 and a spraying area SA2. In addition, the flat display panel cutting apparatus may comprise a cutting means 230 positioned in the cutting area SA1, and for forming primary cracks on the flat display panel 220, the primary cracks including two or more first cracks 221 spaced apart from each other in the X-axis direction and two or more second cracks 222 spaced apart from each other in the Y-axis direction. Besides, the flat display panel cutting apparatus may comprise a spraying means 240 positioned in the spraying area SA2, and for growing the primary cracks into secondary cracks by spraying a high temperature steam onto the first cracks 221 of the primary cracks formed on the flat display panel 220.

The flat display panel 220 may comprise a plurality of display panels positioned in each cell. Here, the display panels positioned in each cell may be one of a liquid crystal display device (LCD), a field emission display device (FED), and a light emitting display device (LED).

The conveyor 210 may be disposed such that the flat display panel 220 loaded on the upper end of a belt can pass through the cutting area SA1 in the X-axis direction and then the flat display panel 220 can pass through the spraying area SA2 in the Y-axis direction. Therefore, the conveyor 210 can feed the flat display panel 220 in the X-axis direction in the cutting area SA1 and in the Y-axis direction in the spraying area SA2 by using a drive means such as a motor. The conveyor 210 may be configured such that a plurality of belts are spaced apart from each other by a predetermined spacing to feed in the X-axis direction and in the Y-axis direction. Once the conveyor 210 is disposed in this manner, the spraying means 240 positioned in the spraying area SA2 can discharge a completed flat display panel from the clamp area PA even while growing the primary cracks formed on the flat display panel 220 into secondary cracks, thereby further improving production yield.

The cutting means 230 may comprise a scribing wheel which rotates in tight contact with the flat display panel 220 or a laser irradiation unit 235 for irradiation of a laser. The cutting means 230 may form primary cracks by applying a physical force to the flat display panel 220. The cutting means 230 may be positioned in a plural number in order to form, on the flat display panel 220 loaded on the conveyor 210, primary cracks including two or more first cracks 221 spaced apart from each other in the X-axis direction and two or more second cracks 222 spaced apart from each other in the Y-axis direction.

The cutting means 230 of this type may be positioned at least one of the upper and lower ends of the conveyor 210. Here, if the cutting means 230 is positioned on the upper end of the conveyor 210, the first cracks 221 and second cracks 222 may be formed at a top portion, which is one surface of the flat display panel. Otherwise, if the cutting means 230 is positioned on the upper end of the conveyor 210, the first cracks 221 and second cracks 222 may be formed at a bottom portion, which is the other surface of the flat display panel 220. Otherwise, if the cutting means 230 is positioned on the upper and lower ends of the conveyor 210, the first cracks 221 and second cracks 222 may be formed on one surface and the other surface of the flat display panel 220, respectively.

The spraying means 240 may be positioned to be stationary. The spraying means 240 can spray a high temperature steam in order to improve segmentation capability by growing the primary cracks formed by the cutting means 230 into secondary cracks, and can be disposed at the same interval as the first cracks 221.

Subsequent to the spraying area SA2, the clamp area PA may be positioned. At least one clamp 250 can be positioned in the clamp area PA so as to adsorb one portion of the flat display panel 220 and separate it.

Hereinafter, a cutting process of the flat display panel cutting apparatus according to the second exemplary embodiment of the invention will be described in detail.

First, there is performed a step of feeding a flat display pane loaded on a conveyor to a cutting area and a spraying area. By this step, when the flat display panel 220 is loaded on the conveyor 210 on which a belt turns in the X-axis direction, the flat display panel 220 is fed to the cutting area SA1.

Next, there is performed a step of forming primary cracks on the cutting area by use of cutting means, the primary cracks including two or more first cracks spaced apart from each other in the X-axis direction and two or more second cracks spaced apart from each other in the Y-axis direction. By this step, the conveyor 210 is periodically operated and stopped within the cutting area SA1, and the cutting means 230 forms, on the flat display panel 220, primary cracks including two or more first cracks 221 spaced apart from each other in the X-axis direction and two or more second cracks 222 spaced apart from each other in the Y-axis direction at each point of time when the conveyor 210 is stopped.

Next, there is performed a step of growing secondary cracks on the spraying area by use of spraying means by spraying a high temperature steam onto the first cracks or second cracks of the primary cracks formed on the flat display panel. By this step, the conveyor 210 feeds the flat display panel 120 having the primary cracks formed thereon into the spraying area SA2. The flat display panel 220 fed to the spraying area SA2 is fed in the Y-axis direction. The spraying means 240, in a stationary state, sprays a high temperature steam to the first cracks 221 in order to grow the primary cracks formed on the flat display panel 220 moving in the Y-axis direction into secondary cracks.

Next, there is performed a step of adsorbing one portion of the flat display panel and separating it from the flat display panel by use of a clamp positioned in the clamp area. By this step, the conveyor 210 feeds the flat display panel 220 having the secondary cracks formed thereon into the clamp area PA, and the clamp 250 is able to adsorb and remove the flat display panel 220 having the secondary cracks formed thereon.

As described above, in the flat display panel cutting apparatus according to the second exemplary embodiment of the invention, the conveyor 210 is disposed such that the flat display panel 220 can be fed in the X-axis direction in the cutting area SA1 and in the Y-axis direction in the spraying area SA2 and the clamp area PA. Then, primary cracks are formed on the flat display panel 220 passing through the cutting area SA1 by using the cutting means 230 moving in the X-axis and Y-axis direction. Next, among the primary cracks formed on the flat display panel 220 passing through the spraying area SA2, the first cracks 221 positioned in the X-axis direction are grown into secondary cracks by using the spraying means 240 which is stationary. Accordingly, the flat display panel cutting apparatus according to the second exemplary embodiment of the invention can solve the problem of a defect at an intersection of the X-axis and Y-axis, edge regions, and the like, and increase panel discharge speed and improve production yield by growing only the first cracks 221 positioned in the X-axis direction upon growth of secondary cracks.

Third Exemplary Embodiment

Figure 6:
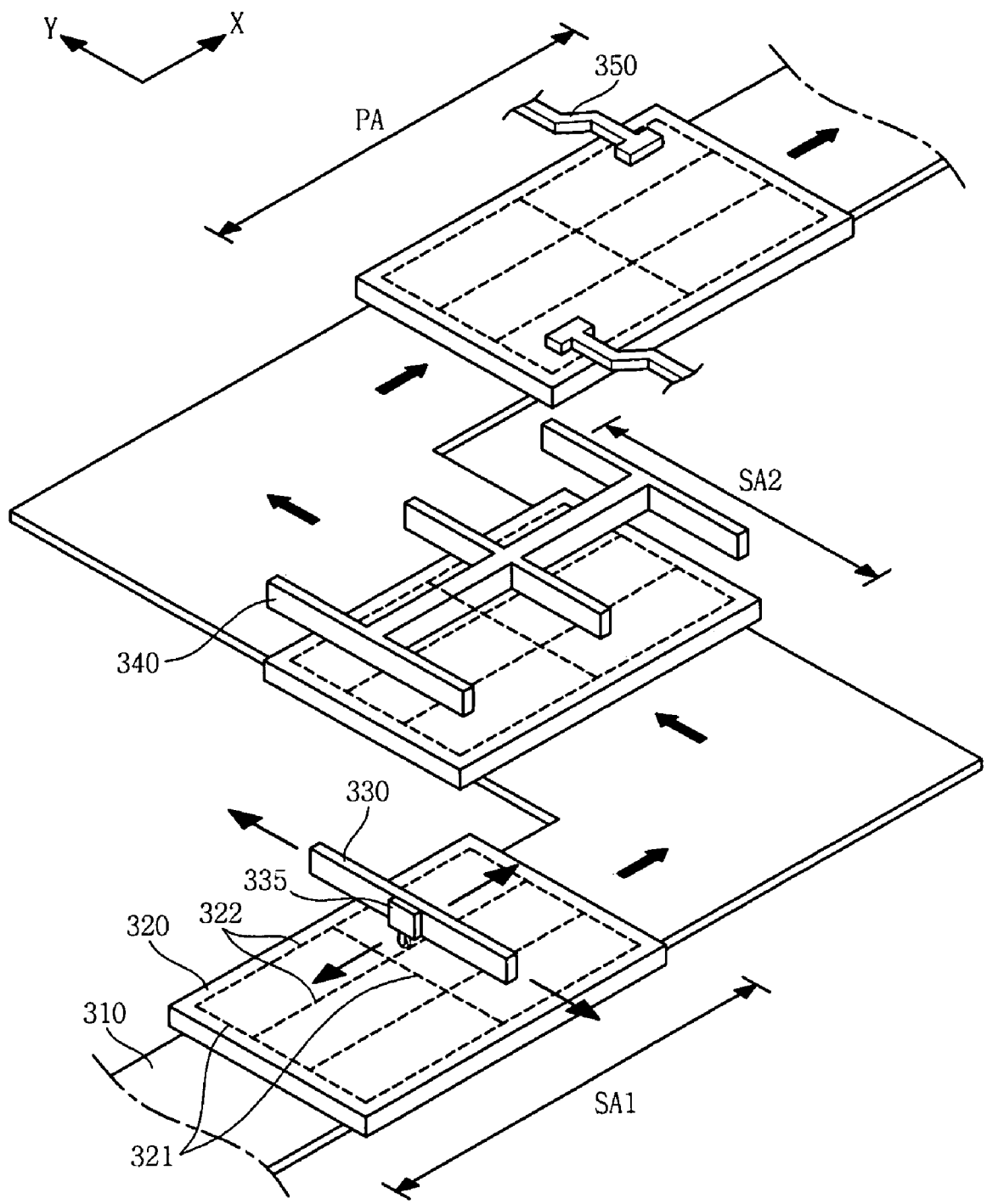
FIG. 6 is a schematic perspective view of a flat display panel cutting apparatus according to a third exemplary embodiment of the invention.

As shown in FIG. 6, a flat display panel cutting apparatus according to a second exemplary embodiment of the invention may comprise a conveyor 310 for feeding a loaded flat display panel 320 to a cutting area SA1 and a spraying area SA2. In addition, the flat display panel cutting apparatus may comprise a cutting means 330 positioned in the cutting area SA1, and for forming primary cracks on the flat display panel 320, the primary cracks including two or more first cracks 321 spaced apart from each other in the X-axis direction and two or more second cracks 322 spaced apart from each other in the Y-axis direction. Besides. The flat display panel cutting apparatus may comprise a spraying means 340 positioned in the spraying area SA2, and for growing the primary cracks into secondary cracks by spraying a high temperature steam onto the first cracks 321 of the primary cracks formed on the flat display panel 320.

The flat display panel 320 may comprise a plurality of display panels positioned in each cell. Here, the display panels positioned in each cell may be one of a liquid crystal display device (LCD), a field emission display device (FED), and a light emitting display device (LED).

The conveyor 310 may be disposed such that the flat display panel 320 loaded on the upper end of a belt can pass through the cutting area SA1 in the X-axis direction, then the flat display panel 320 can pass through the spraying area SA2 in the Y-axis direction, and then the flat display panel 320 can pass through the clamp area PA again in the X-axis direction. Therefore, the conveyor 310 can feed the flat display panel 320 in the X-axis direction in the cutting area SA1, in the Y-axis direction in the spraying area SA2, and again in the X-axis direction in the clamp area PA by using a drive means such as a motor. The conveyor 310 may be configured such that a plurality of belts are spaced apart from each other by a predetermined spacing to feed in the X-axis direction and in the Y-axis direction. Once the conveyor 310 is disposed in this manner, the spraying means 340 positioned in the spraying area SA2 can discharge a completed flat display panel from the clamp area PA even while growing the primary cracks formed on the flat display panel 320 into secondary cracks, thereby further improving production yield.

The cutting means 330 may comprise a scribing wheel which rotates in tight contact with the flat display panel 320 or a laser irradiation unit 335 for irradiation of a laser. The cutting means 330 may form primary cracks by applying a physical force to the flat display panel 320. The cutting means 330 may be positioned in a plural number in order to form, on the flat display panel 320 loaded on the conveyor 310, primary cracks including two or more first cracks 321 spaced apart from each other in the X-axis direction and two or more second cracks 322 spaced apart from each other in the Y-axis direction.

The cutting means 330 of this type may be positioned at least one of the upper and lower ends of the conveyor 310. Here, if the cutting means 330 is positioned on the upper end of the conveyor 310, the first cracks 321 and second cracks 322 may be formed at a top portion, which is one surface of the flat display panel. Otherwise, if the cutting means 330 is positioned on the upper end of the conveyor 310, the first cracks 321 and second cracks 322 may be formed at a bottom portion, which is the other surface of the flat display panel 320. Otherwise, if the cutting means 330 is positioned on the upper and lower ends of the conveyor 310, the first cracks 321 and second cracks 322 may be formed on one surface and the other surface of the flat display panel 320, respectively.

The spraying means 340 may be positioned to be stationary. The spraying means 340 can spray a high temperature steam in order to improve segmentation capability by growing the primary cracks formed by the cutting means 330 into secondary cracks, and can be disposed at the same interval as the first cracks 321.

In the clamp area PA positioned subsequent to the spraying area SA2, at least one clamp 350 can be positioned for adsorbing one portion of the flat display panel 320 and separating it. The clamp 350 may play the role of adsorbing and removing the flat display panel 320 having the secondary cracks formed thereon.

Hereinafter, a cutting process of the flat display panel cutting apparatus according to the third exemplary embodiment of the invention will be described in detail.

First, there is performed a step of feeding a flat display pane loaded on a conveyor to a cutting area and a spraying area. By this step, when the flat display panel 320 is loaded on the conveyor 310 on which a belt turns the X-axis direction, the flat display panel 320 is fed to the cutting area SA1.

Next, there is performed a step of forming primary cracks on the cutting area by use of cutting means, the primary cracks including two or more first cracks spaced apart from each other in the X-axis direction and two or more second cracks spaced apart from each other in the Y-axis direction. By this step, the conveyor 310 is periodically operated and stopped within the cutting area SA1, and the cutting means 330 forms, on the flat display panel 320, primary cracks including two or more first cracks 321 spaced apart from each other in the X-axis direction and two or more second cracks 322 spaced apart from each other in the Y-axis direction at each point of time when the conveyor 310 is stopped.

Next, there is performed a step of growing secondary cracks on the spraying area by use of spraying means by spraying a high temperature steam onto the first cracks or second cracks of the primary cracks formed on the flat display panel. By this step, the conveyor 310 feeds the flat display panel 320 having the primary cracks formed thereon into the spraying area SA2. The flat display panel 320 fed to the spraying area SA2 is fed in the Y-axis direction. The spraying means 340, in a stopped state, sprays a high temperature steam to the first cracks 321 in order to grow the primary cracks formed on the flat display panel 320 moving in the Y-axis direction into secondary cracks.

Next, there is performed a step of adsorbing one portion of the flat display panel and separating it from the flat display panel by use of a clamp positioned in the clamp area. By this step, the conveyor 310 feeds the flat display panel 320 having the secondary cracks formed thereon into the clamp area PA, and the flat display panel 320 fed to the clamp area PA is fed again in the X-axis direction. The clamp 350 is able to adsorb and remove the flat display panel 320 having the secondary cracks formed thereon.

As described above, in the flat display panel cutting apparatus according to the third exemplary embodiment of the invention, the conveyor 310 is disposed such that the flat display panel 320 can be fed in the X-axis direction in the cutting area SA1, in the Y-axis direction in the spraying area SA2, and in the X-axis direction in the clamp area PA. Then, primary cracks are formed on the flat display panel 320 passing through the cutting area SA1 by using the cutting means 330 moving in the X-axis and Y-axis direction. Next, among the primary cracks formed on the flat display panel 320 passing through the spraying area SA2, the first cracks 321 positioned in the X-axis direction are grown into secondary cracks by using the spraying means 340 which is stationary.

Accordingly, the flat display panel cutting apparatus according to the third exemplary embodiment of the invention can solve the problem of a defect at an intersection of the X-axis and Y-axis, edge regions, and the like, and increase panel discharge speed and improve production yield by growing only the cracks positioned in the X-axis direction upon growth of secondary cracks.

As described above, the respective exemplary embodiments of the invention can provide a flat display panel cutting apparatus which can solve the problem of damage or breakage of a cutting portion, increase panel discharge speed, and improve production yield by growing only the cracks positioned in a selected axial direction.

The foregoing embodiments and advantages are merely exemplary and are not to be construed as limiting the invention. The present teaching may be readily applied to other types of apparatuses. The description of the foregoing embodiments is intended to be illustrative, and not to limit the scope of the claims. Many alternatives, modifications, and variations will be apparent to those skilled in the art. In the claims, means-plus-function claims are intended to cover the structures described herein as performing the recited function and not only structural equivalents, but also equivalent structures. Moreover, unless the term "means" is explicitly recited in a limitation of the claims, such limitation is not intended to be interpreted under 35 USC 112(6).

What is claimed is:

1. A flat display panel cutting method, comprising:
feeding a flat display panel loaded on a conveyor to a cutting area and a spraying area;
forming primary cracks on the cutting area by use of cutting means, the primary cracks including two or more first cracks spaced apart from each other in the X-axis direction and two or more second cracks spaced apart from each other in the Y-axis direction; and
growing secondary cracks on the spraying area by use of spraying means by spraying a high temperature steam onto the first cracks or second cracks of the primary cracks formed on the flat display panel,
further comprising adsorbing one portion of the flat display panel and separating the same from the flat display panel by use of a clamp area positioned after the cutting,
wherein, in the growing, the cracks are grown while moving the spraying means in the Y-axis direction,
wherein, in the growing, the cracks are grown by fixing the spraying means,
wherein the spraying means comprises at least one steam bar disposed in one direction,
wherein the steam bar is disposed at the same interval as the interval of the first cracks or second cracks,
wherein, in the feeding, the conveyor is disposed such that the flat display panel can pass through the cutting area in the X-axis direction and pass through the spraying area in the Y-axis direction,
wherein, in the formation of cracks, scribing wheel which rotates in tight contact with the flat display panel or a laser irradiation unit for irradiating a laser to the flat display panel is used as the cutting means,
wherein, in the formation of cracks, the cutting means is positioned at least one of the upper and lower ends of the conveyor.

* * * * *